Patented July 4, 1950

2,514,131

UNITED STATES PATENT OFFICE 2,514,131

PROCESS OF PRODUCING SHEETINGS OF A WATER-SOLUBLE FILM-FORMING MATERIAL

Frank J. Kassuba, Binghamton, N. Y., assignor to General Aniline & Film Corporation, New York, N. Y., a corporation of Delaware No Drawing. Application November 8, 1945, Serial No. 627,528

17 Claims. (Cl. 18—57)

This invention relates to the manufacture of sheets, films, or foils composed of water-soluble, film-forming materials, such as gelatin, and the like. More particularly, the invention relates to a method of facilitating the removal of such sheets, films, and foils from a flat, vitreous surface upon which they are cast.

In the manufacture of sheets, films, or foils, (which, for sake of brevity, will be referred to hereinafter as sheeting) from gelatin or other water-soluble, film-forming materials such as hydroxy ethyl cellulose, methyl cellulose, pectin, polyvinyl alcohol, and the like, it is common practice to coat an aqueous solution of gelatin or other film-forming material onto a highly polished, smooth, and flat metal plate or sheet. The solution is then chilled and dried. When dry, the sheeting is stripped from the metal plate or sheet and cut to size. Unfortunately, metal sheets bend, sag, rust, or become pitted, and in each case the dried sheeting duplicates the characteristics and imperfections of the metal surface. When the solution is, however, cast upon a glass plate the dry sheeting peels off erratically and with difficulty, and as a result the sheeting is either torn or wrinkled. In addition some of the dyes which are used to color solutions of gelatin and other film-forming materials, when preparing filter foils for photographic purposes, promote adhesion of the dried sheeting to the glass plate to such an extent that it is impossible to remove the sheeting. To permit a ready stripping of the dried sheeting from the glass it has been taught that the glass should be waxed or polished with chalk. This expedient, however, has never been found to be particularly satisfactory, since waxing or polishing of the glass does not always operate satisfactorily, and often transfers a poor surface to the side of the sheeting in contact with the glass.

The principal object of the present invention is to provide an improved method of removing a dried water-soluble, film-forming material, in the form of a sheeting, from a flat, vitreous surface.

Another object is to provide sheetings of water-soluble, film-forming materials which will readily strip from a flat, vitreous casting surface.

Other objects and advantages of the invention will be apparent from the following description.

I have discovered that sheetings composed of gelatin and other water-soluble, film-forming materials which will fulfill the above objects, can be prepared by coating the vitreous casting surface with a solution of an onium salt and casting the aqueous solution of the film-forming material thereon, or by incorporating the onium salt directly in the aqueous solution of the film-forming material prior to casting. The onium salt contemplated by my invention corresponds to the following general formulae:

(A) 

(B) 

(C) 

(D) 

wherein R is an aliphatic radical of from 4 to 20 carbon atoms, such as alkyl, e. g., butyl, amyl, octyl, decyl, octadecyl, and the like, cycloalkyl, e. g., cyclohexyl, cyclooctyl, cyclopentyl, and the like, alkyl, a carbon atom of which is substituted by cycloalkyl e. g., cyclohexyl butyl, cyclopentyl hexyl, cyclohexyl octyl, cyclopentyl decyl, and the like, alkoxyalkyl, e. g., butyloxymethyl, hexyloxymethyl, lauryloxymethyl, decyloxymethyl, octadecyloxymethyl, and the like, or an acyl-aminomethyl, e. g., butanoylaminomethyl, caproylaminomethyl, palmitoylaminomethyl, lauroylaminomethyl, stearoylaminomethyl, and the like. $R_1$, $R_2$, and $R_3$ represent alkyl groups, which may be alike or different, e. g., methyl, ethyl, propyl, butyl, and the like; X represents an acid radical, e. g., Cl, Br, F, $SO_4$, $ClO_4$, $SO_4CH_3$, $SO_4C_2H_5$, $SO_3C_6H_4CH_3$, and the like; and Z represents the atoms necessary to complete a 5- or 6-membered nitrogenous heterocyclic ring structure, e. g., pyridine, 1-, 2-, and 3-methylpyridine, lutidine, ethylpyridine, 2.4.6-trimethylpyridine, quinoline, isoquinoline, N-methyl morpholine, di-coniine, pyrrole, pyrrolidine, N-methyl-piperidine, and the like.

The following are examples of suitable quaternary ammonium, quaternary phosphonium, and ternary sulfonium salts, which may be employed for the purpose herein set forth.

(1) 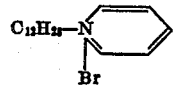

Dodecyl pyridinium bromide (2) 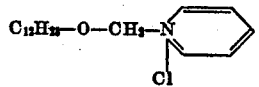

Dodecyloxymethyl pyridinium chloride (3) $C_{18}H_{37}-O-CH_2N(C_2H_5)_3$
      $\quad\quad\quad\quad\quad\quad\quad\quad |$
      $\quad\quad\quad\quad\quad\quad\quad\quad Cl$ Octadecyloxymethyl triethyl ammonium chloride (4) $C_{12}H_{25}-N(C_2H_5)_3$
      $\quad\quad\quad\quad |$
      $\quad\quad\quad\quad Cl$ Dodecyl-triethyl-ammonium chloride (5) Dodecyl quinolinium bromide (6) N-methyl-N-octadecyl-morpholinium chloride (7) $C_{11}H_{23}CONHCH_2-N\langle\rangle$
      $\quad\quad\quad\quad\quad\quad\quad\quad\quad Cl$ Lauroyl aminomethyl pyridinium chloride (8) Dodecyl-dimethyl-ethyl ammonium chloride (9) Dodecyl trimethyl phosphonium bromide

(10) Dodecyl diethyl methyl phosphonium bromide

(11) Cetyl trimethyl phosphonium bromide

(12) Dodecyl dimethyl sulfonium methyl sulfate

(13) Dodecyl ethyl methyl sulfonium bromide

(14) Cetyl dimethyl sulfonium methyl sulfate

Suitable solvents for preparing solutions of the abovementioned quaternary ammonium, quaternary phosphonium, and ternary sulfonium salts (which hereinafter will be referred to as onium salts), are water, aqueous alcohol, and aqueous ketone containing not more than 50% of the alcohol or ketone e. g., methyl alcohol, ethyl alcohol, propyl alcohol, isopropyl alcohol, acetone, ethyl methyl ketone, diethyl ketone, and the like. It is to be noted, however, that any aqueous-organic solvent mixture may be employed in preparing solutions of these onium salts. The nature of the solvent mixture is immaterial so long as it dissolves and is compatible with the onium salt, and is sufficiently volatile, so as to permit evaporation at room temperature or in heated air from the treated material. Accordingly, therefore, solvent mixtures, other than those abovementioned, may be employed, the selection depending more or less on the ease of the vaporizability of the solvent mixture selected. Other solvent mixtures may be selected by trial or reference to The Critical Tables.

In practicing the present invention a plate of glass, vitreosil, enameled metal, porcelain, fused quartz, fused silica, or any other vitreous substance presenting a flat and smooth coating surface, is treated with a solution of an onium salt ranging in concentration from 5 to 25 parts per liter of solvent or solvent mixture and dried. The resulting surface is then used for coating solutions of gelatin and other water-soluble, film-forming materials. The sheetings adhere properly until dry and peel off without difficulty. Instead of treating the casting surface with a solution of the onium salt, the onium salt per se may be incorporated into the solution containing gelatin or other film-forming material. The concentration of the onium salt employed in this case varies from 0.1 to 5 parts by weight per 10 to 20 parts by weight of dry gelatin or other film-forming material. The desirable concentration of the onium salt, however, is from 0.1 to 5 parts by weight per 10 parts by weight of dry gelatin or other film-forming material.

In preparing solutions of gelatin or other film-forming materials, the usual plasticizers and hardeners may be employed. In preparing light filter foils, an adequate amount of a suitable dye solution may be added.

For a fuller understanding of the nature of the invention reference is made to the following examples which are given merely to further illustrate the invention, and should not be regarded as limitative.

*Example I*

A stock solution of about 10% gelatin was prepared from a clear, colorless gelatin. To 100 cc. of this stock solution 1 cc. of glycerin and 0.5 cc. of a 10% aqueous solution of formaldehyde, were added with stirring. After an additional stirring of about 1 or 2 minutes, the resulting mixture was filtered through cheese cloth. A glass plate having an area of 130 square inches, which had been previously treated with a 5% solution (aqueous alcohol) of dodecyl pyridinium bromide and dried, is carefully leveled and the filtered mixture is poured thereon. As the gelatin solution is poured onto this treated glass plate, it is spread evenly over the surface. When the gelatin solution has been poured onto the plate, it is allowed to anneal or level off for a minute or two so as to smooth out any irregularities of thickness by flowing to its natural level state. The entire glass plate is then chilled at a temperature of about 32° F. for 5-10 minutes to set the mixture. When set, the gelatin coated plate was dried for several hours at room temperature and then stripped with slight tension from the treated glass surface without wrinkling or tearing. The foil is then cut into appropriate sizes and shapes.

*Example II*

Example I was repeated with the exception that the gelatin was substituted by an equivalent amount of hydroxy ethyl cellulose, the formaldehyde content was increased two-fold, and the dodecyl pyridinium bromide solution was replaced by a 5% solution (aqueous acetone) of dodecyl trimethyl phosphonium bromide. The same ease of stripping was experienced as with the dried gelatin foil.

*Example III*

Example I was repeated with the exception that the gelatin was substituted by an equivalent amount of pectin and the dodecyl pyridinium bromide solution was replaced by a 5% aqueous solution of dodecyl dimethyl sulfonium methyl sulfate.

*Example IV*

A gelatin solution of the following composition was prepared:

| | |
|---|---|
| Gelatin | gms 10 |
| Water | cc 90 |
| Glycerin | cc 1 |
| Formaldehyde (10% solution) | cc 0.5 |
| Dodecyl pyridinium bromide | gm 1 |

This solution was filtered and coated on an untreated, flat, smooth, glass plate surface. After chilling and drying, the foil was stripped with slight tension from the plate without wrinkling or any other sign of injury.

*Example V*

Example IV was repeated with the exception that the gelatin was substituted by an equivalent amount of hydroxy ethyl cellulose and the dodecyl pyridinium bromide by an equivalent amount of dodecyl trimethyl phosphonium bromide.

*Example VI*

Example IV was repeated with the exception that the gelatin was substituted by an equivalent amount of pectin and the dodecyl pyridinium bromide was substituted by an equivalent amount of dodecyl dimethyl sulfonium methyl sulfate. The same ease of stripping was experienced as in Examples IV and V.

It is to be understood that wherein the claims appended hereto, the term "sheetings" is used, that such term is intended to include films and foils.

While the present invention has been described in considerable detail with reference to certain preferred procedures, materials and uses, it is understood that the invention is not limited thereto, and that numerous variations may be made in the procedures herein described, and that equivalent materials may be substituted. All such modifications and variations are within the scope of the invention as defined by the appended claims.

I claim:

1. The process of producing sheetings of water-soluble, film-forming material without injury to said sheetings, which comprises casting a water-solution of such material onto a flat and smooth vitreous surface in the presence of an onium compound selected from the class consisting of those of the following formulae:

(A) 

(B) 

(C) 

(D) 

wherein R is a member selected from the class consisting of an aliphatic radical of from 4 to 20 carbon atoms, $R_1$, $R_2$, and $R_3$ are alkyl, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

2. The process of producing sheetings of a water-soluble, film-forming material without injury to said sheetings, which comprises casting a water-solution of such material onto a flat and smooth vitreous plate, the surface of which has been treated with an onium compound selected from the class consisting of those of the following formulae:

(A) 

(B) 

(C) 

(D) 

wherein R is a member selected from the class consisting of an aliphatic radical of from 4 to 20 carbon atoms, $R_1$, $R_2$, and $R_3$ are alkyl, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

3. The process of producing sheetings of water-soluble, film-forming material without injury to such sheetings which comprises casting onto a flat and smooth vitreous surface a water-solution of such material containing an onium compound selected from the class consisting of those of the following formulae:

(A) 

(B) 

(C) 

(D) 

wherein R is a member selected from the class consisting of an aliphatic radical of from 4 to 20 carbon atoms, $R_1$, $R_2$ and $R_3$ are alkyl, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

4. The process according to claim 1, wherein said onium compound is dodecyl pyridinium bromide.

5. The process according to claim 2, wherein said onium compound is dodecyl trimethyl phosphonium bromide.

6. The process according to claim 3, wherein said onium compound is dodecyl dimethyl sulfonium methyl sulfate.

7. The process of producing sheetings of water-soluble, film-forming material without injury to said sheetings, which comprises casting a water-solution of such material onto a flat and smooth vitreous surface in the presence of an onium compound of the following general formula:

wherein R is a member selected from the class consisting of an aliphatic radical of 4 to 20 carbon atoms, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

8. The process of producing sheetings of water-soluble, film-forming material without injury to said sheetings, which comprises casting a water-solution of such material onto a flat and smooth vitreous surface in the presence of an onium compound of the following general formula:

wherein R is a member selected from the class consisting of an aliphatic radical of 4 to 20 carbon atoms, $R_1$, $R_2$, and $R_3$ are alkyl, and X represents an acid radical evaporating the water and stripping the resultant film from said vitreous surface, said onium compound being present in an amount between 0.1 and 5 parts by weight per 10 parts by weight of film forming material.

9. The process of producing sheetings of water-soluble, film-forming material without injury to said sheetings, which comprises casting a water-solution of such material onto a flat and smooth vitreous surface in the presence of an onium compound of the following general formula:

wherein R is a member selected from the class consisting of an aliphatic radical of 4 to 20 carbon atoms, $R_1$ and $R_2$ are alkyl, and X represents an acid radical evaporating the water and stripping the resultant film from said vitreous surface, said onium compound being present in an amount between 0.1 and 5 parts by weight per 10 parts by weight of film forming material.

10. The process of producing sheetings of a water-soluble, film-forming material without injury to said sheetings, which comprises casting a water-solution of such material onto a flat and smooth vitreous plate, the surface of which has been treated with an onium compound of the following general formula:

wherein R is a member selected from the class consisting of an aliphatic radical of 4 to 20 carbon atoms, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

11. The process of producing sheetings of a water-soluble, film-forming material without injury to said sheetings, which comprises casting a water-solution of such material onto a flat and smooth vitreous plate, the surface of which has been treated with an onium compound of the following general formula:

wherein R is a member selected from the class consisting of an aliphatic radical of 4 to 20 carbon atoms, $R_1$, $R_2$, and $R_3$ are alkyl, and X represents an acid radical evaporating the water and stripping the resultant film from said vitreous surface, said onium compound being present in an amount between 0.1 and 5 parts by weight per 10 parts by weight of film forming material.

12. The process of producing sheetings of a water-soluble, film-forming material without injury to said sheetings, which comprises casting a water-solution of such material onto a flat and smooth vitreous plate, the surface of which has been treated with an onium compound of the following general formula:

wherein R is a member selected from the class consisting of an aliphatic radical of 4 to 20 carbon atoms, $R_1$ and $R_2$ are alkyl, and X represents an acid radical evaporating the water and stripping the resultant film from said vitreous surface, said onium compound being present in an amount between 0.1 and 5 parts by weight per 10 parts by weight of film forming material.

13. The process of producing sheetings of a water-soluble, film-forming material without injury to said sheetings, which comprises casting onto a flat and smooth vitreous surface a water-solution of such material containing an onium compound of the following general formula:

wherein R is a member selected from the class consisting of an aliphatic radical of 4 to 20 carbon atoms, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

14. The process of producing sheetings of a water-soluble, film-forming material without injury to said sheetings, which comprises casting onto a flat and smooth vitreous surface a water-solution of such material containing an onium compound of the following general formula:

wherein R is a member selected from the class consisting of an aliphatic radical of from 4 to 20 carbon atoms, $R_1$, $R_2$, and $R_3$ are alkyl, and X represents an acid radical evaporating the water and stripping the resultant film from said vitreous surface, said onium compound being present in an amount between 0.1 and 5 parts by weight per 10 parts by weight of film forming material.

15. The process of producing sheetings of a water-soluble, film-forming material without injury to said sheetings, which comprises casting onto a flat and smooth vitreous surface a water-solution of such material containing an onium compound of the following general formula:

wherein R is a member selected from the class consisting of an aliphatic radical of from 4 to 20 carbon atoms, $R_1$ and $R_2$ are alkyl, and X represents an acid radical evaporating the water and stripping the resultant film from said vitreous surface, said onium compound being present in an amount between 0.1 and 5 parts by weight per 10 parts by weight of film forming material.

16. The process of producing gelatin sheetings which comprises casting a water solution of gelatin onto a vitreous surface in the presence of an onium compound selected from the class consisting of those of the following formulae:

(A) 

(B) 

(C) 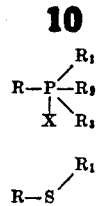

(D) 

wherein R is a member selected from the class consisting of an aliphatic radical of from 4 to 20 carbon atoms, $R_1$, $R_2$, and $R_3$ are alkyl, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

17. The process of producing gelatin sheetings which comprises casting a water solution of gelatin onto a flat and smooth vitreous plate the surface of which has been treated with an onium compound and dried, said onium compound selected from the class consisting of those of the following formulae:

(A) 

(B) 

(C) 

(D) 

wherein R is a member selected from the class consisting of an aliphatic radical of from 4 to 20 carbon atoms, $R_1$, $R_2$, and $R_3$ are alkyl, X represents an acid radical, and Z represents the atoms necessary to complete a nitrogenous heterocyclic ring evaporating the water and stripping the resultant film from said vitreous surface, said onium compound being present in an amount between 0.1 and 5 parts by weight per 10 parts by weight of film forming material.

FRANK J. KASZUBA.

REFERENCES CITED

The following references are of record in the file of this patent:

UNITED STATES PATENTS

| Number | Name | Date |
|---|---|---|
| 2,165,356 | Dunbar | July 11, 1939 |
| 2,179,196 | Polak et al. | Nov. 7, 1939 |
| 2,259,426 | Ray | Oct. 14, 1941 |
| 2,271,468 | Watkins | Jan. 27, 1942 |
| 2,419,281 | Noble | Apr. 22, 1947 |